United States Patent
Ha et al.

(10) Patent No.: US 12,346,774 B2
(45) Date of Patent: Jul. 1, 2025

(54) APPARATUS AND METHOD FOR DECODING QUANTUM LOW-DENSITY PARITY-CHECK CODE

(71) Applicant: Korea Advanced Institute of Science and Technology, Daejeon (KR)

(72) Inventors: Jeongseok Ha, Daejeon (KR); Jaemin Kim, Daejeon (KR); Hyunwoo Jung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 18/407,498

(22) Filed: Jan. 9, 2024

(65) Prior Publication Data

US 2025/0148344 A1    May 8, 2025

(30) Foreign Application Priority Data

Jul. 11, 2023    (KR) .................. 10-2023-0089867

(51) Int. Cl.
    *G06N 10/70*    (2022.01)
(52) U.S. Cl.
    CPC .................. *G06N 10/70* (2022.01)

(58) Field of Classification Search
    CPC ........................................ G06N 10/70
    See application file for complete search history.

(56) References Cited

U.S. PATENT DOCUMENTS

| | | | | |
|---|---|---|---|---|
| 2009/0113267 A1* | 4/2009 | Harrison | ............ | H03M 13/37 |
| | | | | 714/E11.002 |
| 2024/0135219 A1* | 4/2024 | Rengaswamy | ........ | H04B 10/70 |

FOREIGN PATENT DOCUMENTS

KR    10-2021-0128217 A    10/2021

* cited by examiner

*Primary Examiner* — Joseph D Torres
(74) *Attorney, Agent, or Firm* — NKL Law; Jae Youn Kim (57) ABSTRACT

An apparatus and method for decoding a quantum low density parity-check code using quantum channel information whereby the apparatus and method provide a technique of performing iterative decoding initially using a first error correction and when error correction fails using a second error correction, in a process decoding a quantum low-density parity-check code based on a belief propagation algorithm.

15 Claims, 11 Drawing Sheets

APPARATUS AND METHOD FOR DECODING QUANTUM LOW-DENSITY PARITY-CHECK CODE

This study relates to the research on quantum computing basic technology for artificial intelligence (No. 1711193112) according to a research project conducted with the support of the Information and Communication Planning and Evaluation Institute with funding from the Ministry of Science and ICT (Government) in 2023.

In addition, this study relates to the research on development of signal processing and error correction technology for data-centric computing (No. 1711188359) according to a research project conducted with the support of the National Research Foundation of Korea with funding from the Ministry of Science and ICT (Government) in 2022 and 2023.

CROSS-REFERENCE TO RELATED APPLICATION

This application is based on and claims priority from Korean Patent Application No. 10-2023-0089867, filed on Jul. 11, 2023, the disclosure of which is incorporated herein in its entirety by reference for all purposes.

TECHNICAL FIELD

The present disclosure relates to an apparatus and method for decoding a quantum low-density parity-check code.

BACKGROUND

A quantum low-density parity-check code decoding algorithm is a process of estimating an error that occurs in a qubit and correcting the error through a recovery operator. A typical example of the quantum low-density parity-check code decoding algorithm is a belief propagation algorithm. However, the belief propagation algorithm does not exploit degeneracy, which causes a problem in the decoding of a quantum low-density parity check code. To overcome such a problem, research on algorithms such as an enhanced feedback algorithm which employs a post-processing algorithm is being conducted in order to exploit degeneracy even in the belief propagation algorithm.

However, even with the enhanced feedback algorithm, in the event of a failure to estimate an error, there still remains the problem of lowering of decoding efficiency due to an excessive number of decoding iterations in an iterative decoding process.

PRIOR ART DOCUMENT (Patent Document 1) Korean Laid-Open Patent Publication No. 10-2021-0128217 entitled "Turbo decoding apparatus and turbo code communication method considering quantized channel"

SUMMARY

An aspect of the present disclosure is to provide a technique of performing iterative decoding when error correction fails, in a process of decoding a quantum low-density parity-check code based on a belief propagation algorithm.

Another aspect of the present disclosure is to provide a technique of increasing the efficiency of iterative decoding when error correction fails.

Another aspect of the present disclosure is to provide a technique of reconfiguring quantum channel information based on the relationship between an unsatisfied check node and a variable node in an iterative decoding process.

Another aspect of the present disclosure is to provide a technique of determining at least one variable node whose quantum channel information will be reconfigured, according to priority in an iterative decoding process.

According to one aspect of the present disclosure, it is possible to increase the efficiency of iterative decoding when error correction fails, in a process of decoding a quantum low-density parity-check code based on a belief propagation algorithm.

According to another aspect of the present disclosure, it is possible to reconfigure quantum channel information based on the relationship between an unsatisfied check node and a variable node in an iterative decoding process.

According to another aspect of the present disclosure, it is possible to determine a variable node whose quantum channel information will be reconfigured, according to priority in an iterative decoding process.

DETAILED DESCRIPTION

Advantages and features of the present disclosure and methods for achieving them will be made clear from the embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the present disclosure to those skilled in the art. The present disclosure is merely defined by the scope of the claims.

In describing the embodiments of the present disclosure, detailed descriptions of known functions or configurations will be omitted except when actually necessary in describing the embodiments of the present disclosure. In addition, terms to be described later are terms defined in consideration of functions in an embodiment of the present disclosure, which may vary according to a user's or operator's intention or practice. Therefore, the definition should be made based on the contents throughout this specification.

The terms such as "unit" and "-er" used hereinafter refer to one or more units for processing at least one function or operation, which may be implemented by hardware, software, or a combination thereof.

A stabilizer code is one of the most studied quantum error correcting codes at the moment. Stabilizer codes are formed based on group theory and are similar to classical linear error correcting codes, and many of the quantum error correcting codes are stabilizer codes.

Stabilizer codes are defined as a stabilizer group S which is an Abelian subgroup of a Pauli group, and code space C may be expressed by the following Equation 1:

$$C = \{|\psi\rangle \mid S|\psi\rangle = |\psi\rangle \text{ for all } S \in \mathcal{S}\} \quad \text{[Equation 1]}$$

Stabilizer operators are used to extract syndrome information identifying an error that occurs in a qubit. In this case, codes having a sparse parity-check matrix because of stabilizer operators with generally low weight are called quantum low-density parity-check codes. The quantum low-density parity-check codes are advantageous for fault tolerant decoding because the number of qubits susceptible to external factors in a decoding process for error correction is relatively small. Moreover, the quantum low-density parity-check codes may have degeneracy, which is one of the quantum features that makes them distinct from classical codes. This feature may improve the performance of quantum error correcting codes.

A decoding algorithm for quantum low-density parity-check codes is a process of estimating an error E that occurs in a qubit and correcting it through a recovery operator. In order to estimate an error that occurs in a qubit state, it is necessary to make a measurement. However, a direct measurement of a qubit holding information collapses the superposition state of the qubit, resulting in a loss of the information. Thus, in order to detect an error without loss of the information the qubit is carrying, ancilla bits may be additionally used to configure a quantum circuit and make a measurement. The quantum circuit as used herein is referred to as a syndrome extraction circuit, and measurements obtained using the syndrome extraction circuit are referred to as syndrome information (hereinafter, actual syndrome information). Afterwards, the decoding algorithm determines a recovery operator to use in an error correction process by estimating an error based on the syndrome information.

Unlike classical error correcting codes, quantum error correcting codes may have degeneracy which is one of the quantum features. Degeneracy is the ability to restore information for different errors through the same decoding operator. Different error operators $E_1, E_2$ in a degeneracy relationship satisfy the following Equation 2.

$$E_1 E_2 = S \text{ for any } S \in \mathcal{S} \quad \text{[Equation 2]}$$

Different error operators in a degeneracy relationship have the same effect on the codewords of the quantum error correcting codes. This means that it is not just one error that needs to be estimated through the decoding process. Unlike classical error correcting codes which estimate only a single error, the quantum error correcting codes may be successfully decoded by estimating any one of error operators that have the same effect on codewords as an actual error does.

A typical example of an algorithm for decoding quantum low-density parity-check codes includes a belief propagation algorithm. The decoding of quantum low-density parity-check codes is a process of estimating an error through a belief propagation algorithm by using syndrome information for identifying the presence or absence of an error in a qubit. In the belief propagation algorithm, channel values are initialized by using a depolarizing channel as a quantum error channel. The depolarizing channel is often used as a quantum channel, and quantum errors X, Z, and Y all have a probability of p/3. Here, p is the error rate of the qubit.

Figure 1:
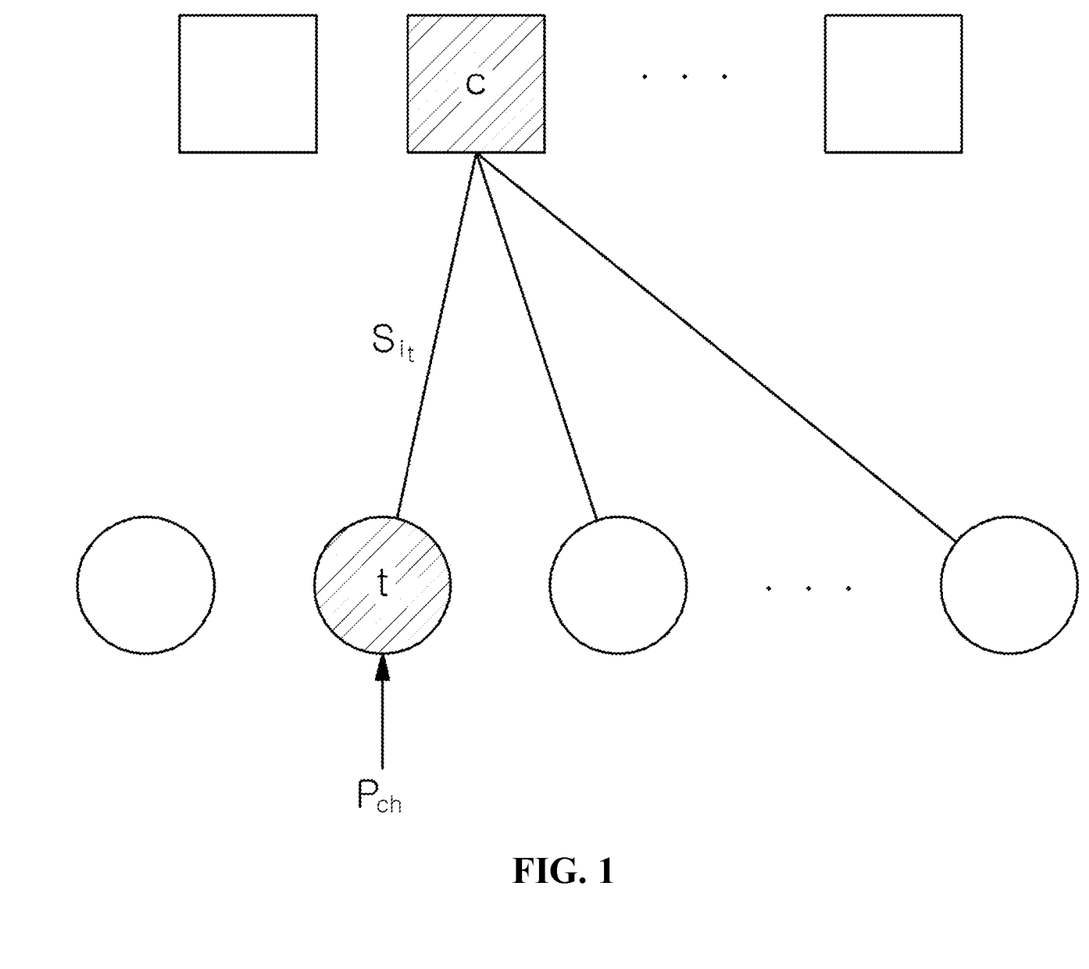
FIG. 1 is a view for explaining the decoding of a quantum low-density parity-check code according to the conventional art.

The belief propagation algorithm does not have degeneracy, which is considered a problem in the decoding of a quantum low-density parity check code. Thus, enhanced algorithms have been proposed which have higher performance than the existing belief propagation algorithm by employing a post-processing algorithm in order to use degeneracy, and the enhanced feedback algorithm is a typical post-processing algorithm employed in belief propagation. As opposed to a belief propagation algorithm that performs decoding simply by utilizing syndrome information, the enhanced feedback algorithm utilizes stabilizer operator information as well as the syndrome information. After a failed decoding using a belief propagation decoding algorithm, it is determined that error estimation for a certain variable node connected to an unsatisfied check node is incorrect, and a new channel model is created which utilizes stabilizer operator information corresponding to this unsatisfied check node, and the post-processing algorithm performs iterative decoding. In this case, the unsatisfied check node occurs when syndrome information calculated based on an estimated error and a stabilizer operator does not match actual syndrome information. Referring to FIG. 1, the black square represents an unsatisfied check node c, and a variable node arbitrarily selected from among variable nodes connected to the unsatisfied check node c is denoted by t. Suppose that the syndrome information of the check node c is 1 and the calculated syndrome information is 0, the channel model for the variable node t may be expressed by the following Equation 3:

$$P_{ch}(E_t = a) = \begin{cases} \dfrac{p}{2}, & \text{if } a = I \text{ or } S_{i_t} \\ \dfrac{1-p}{2}, & \text{otherwise} \end{cases} \quad \text{[Equation 3]}$$

where p and $S_{i_t}$ represent the error rate of the depolarizing channel and the operator at a t-th position, among the stabilizer operators corresponding to an i-th check node, respectively. Since the actual syndrome information is 0, it is determined that the variable node t should be replaceable with the $S_{i_t}$ operator. Thus, the probability values of I and $S_{i_t}$ are increased, and I and $S_{i_t}$ are interchangeable operators. Likewise, suppose that the syndrome information of the check node c is 0 and the calculated syndrome information is 1, the channel model for the variable node t can be expressed by the following Equation 4:

$$P_{ch}(E_t = a) = \begin{cases} \dfrac{1-p}{2}, & \text{if } a = I \text{ or } S_{i_t} \\ \dfrac{p}{2}, & \text{otherwise} \end{cases} \quad \text{[Equation 4]}$$

In the enhanced feedback algorithm, one of the variable nodes connected to the unsatisfied check node is arbitrary selected, the channel information is changed, and then an iterative decoding process is performed. If the iterative decoding process fails, one of the variable nodes connected to the unsatisfied check node is arbitrary selected, the channel information is changed, and then another iterative decoding process is performed. The number of iterative decoding attempts is predetermined.

The present disclosure suggests a technique of reconfiguring quantum channel information based on the relationship between an unsatisfied check node and a variable node in an iterative decoding process, and a technique of determining at least one variable node whose quantum channel information will be reconfigured, according to priority in an iterative decoding process. A detailed description of this will be given later with reference to FIGS. 2 to 11.

Figure 2:
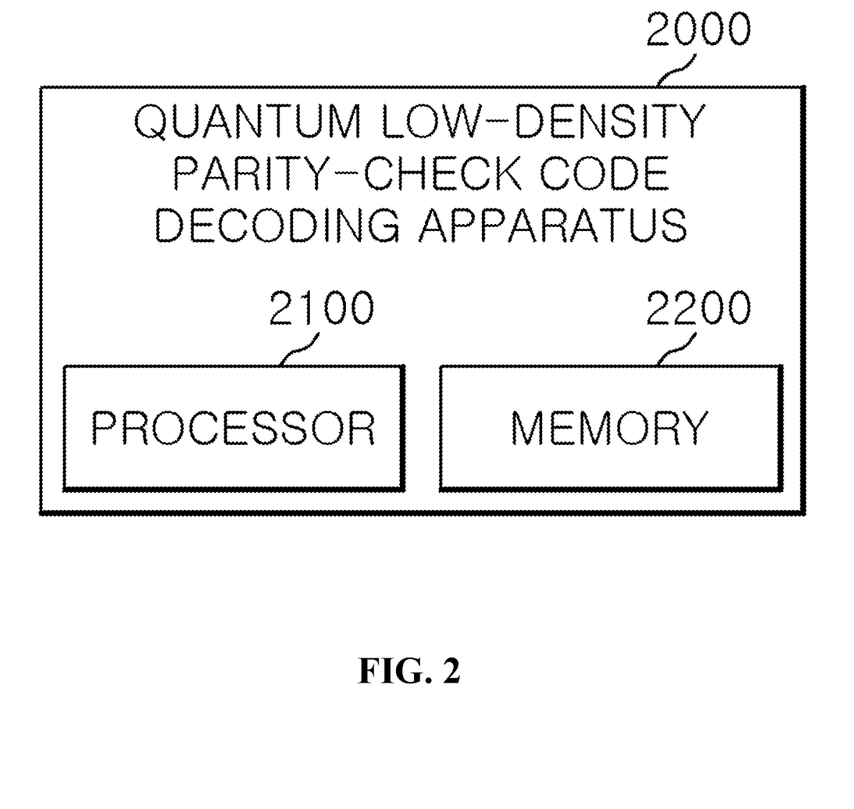
FIG. 2 is a block diagram of an apparatus for decoding a quantum low-density parity-check code according to an embodiment of the present disclosure.

FIG. 2 is a block diagram of an apparatus for decoding a quantum low-density parity-check code according to an embodiment of the present disclosure.

Referring to FIG. 2, the quantum low-density parity-check code decoding apparatus 2000 may include a processor 2100 and a memory 2200.

The processor 2100 may decode a quantum low-density parity-check code and control the overall operation of the quantum low-density parity-check code decoding apparatus 2000, by executing instructions stored in the memory 2100.

The memory 2100 may store an instruction for decoding the quantum low-density parity-check code and an instruction for controlling the overall operation of the quantum low-density parity-check code decoding apparatus 2000.

Hereinafter, a more detailed description of the decoding of a quantum low-density parity-check code by the quantum low-density parity-check code decoding apparatus 2000 will be given below with reference to FIGS. 3 to 10.

Figure 3:
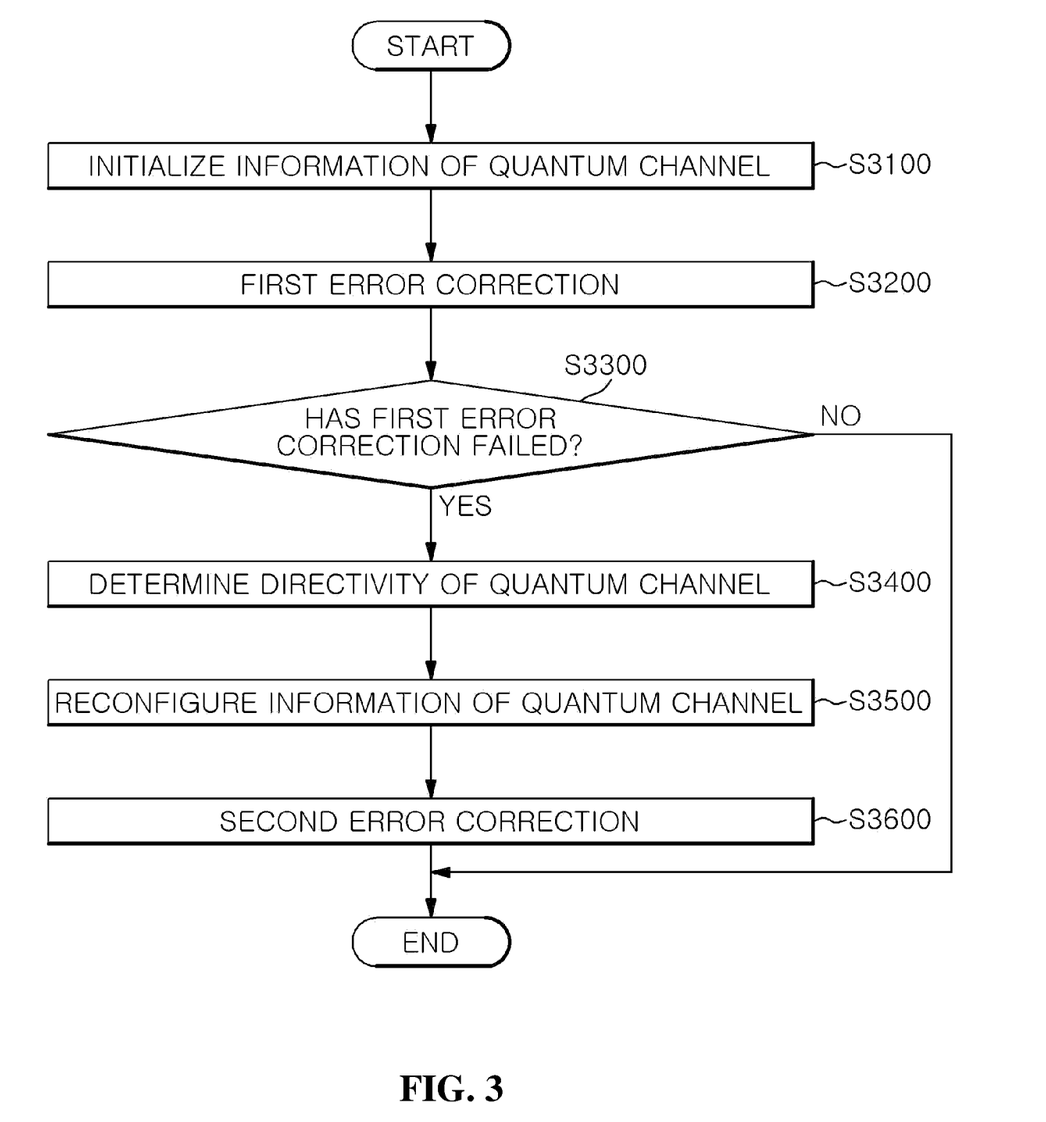
FIG. 3 is a flowchart of a method for decoding a quantum low-density parity-check code according to an embodiment of the present disclosure.

FIG. 3 is a flowchart of a method for decoding a quantum low-density parity-check code according to an embodiment of the present disclosure.

The following description will be given with an example in which the method is performed by the quantum low-density parity-check code decoding apparatus 2000.

In the step S3100, the quantum low-density parity-check code decoding apparatus 2000 may initialize quantum channel information corresponding to each of a plurality of variable nodes. Here, the quantum channel information may include the error rate of the quantum channel and the probabilities of quantum error operators.

In an embodiment, the quantum low-density parity-check code decoding apparatus 2000 may initialize the quantum channel information by using a depolarizing channel. With the depolarizing channel, quantum errors X, Z, and Y have a probability of p/3, where p is the error rate of the qubit.

In the step S3200, the quantum low-density parity-check code decoding apparatus 2000 may estimate an error in a qubit based on a belief propagation algorithm using the quantum channel information.

In an embodiment, the belief propagation algorithm may be an enhanced feedback algorithm.

In an embodiment, the quantum low-density parity-check code decoding apparatus 2000 may calculate syndrome information for each of a plurality of check nodes based on an estimated error and a stabilizer operator, and determine whether the calculated syndrome information matches actual syndrome information by comparing them.

In an embodiment, if the calculated syndrome information and the actual syndrome information match for every check node, the quantum low-density parity-check code decoding apparatus 2000 may decode the qubit by correcting the estimated error by using a recovery operator.

In an embodiment, if the calculated syndrome information and the actual syndrome information do not match for at least one of the plurality of check nodes, the quantum low-density parity-check code decoding apparatus 2000 may determine that this check node is an unsatisfied check node. In this case, the quantum low-density parity-check code decoding apparatus 2000 may not perform decoding since the error estimation for this check node is incorrect.

In an embodiment, the actual syndrome information may refer to syndrome information that is measured by a quantum circuit using ancilla qubits, i.e., a syndrome extraction circuit.

In the step S3300, the quantum low-density parity-check code decoding apparatus 2000 may determine whether a first error correction has failed or not, depending on the presence or absence of a plurality of check nodes. That is, if the calculated syndrome information and the actual syndrome information do not match for any of the plurality of check nodes, the quantum low-density parity-check code decoding apparatus 2000 may determine that the first error correction has failed. Also, if there is not even a single check node whose calculated syndrome information does not match its actual syndrome information, the quantum low-density parity-check code decoding apparatus 2000 determines that the first error correction is successful.

In the step S3400, the quantum low-density parity-check code decoding apparatus 2000 may determine the directivity of errors in the quantum channel for a variable node connected to the unsatisfied check node, based on the connection relationship between the unsatisfied check node and the variable node connected to the unsatisfied check node. Here, the directivity may include the error rate and the probabilities of quantum error operators, which are required for correcting the quantum channel information.

In an embodiment, for a variable node connected to an unsatisfied check node, the quantum low-density parity-check code decoding apparatus 2000 may determine the directivity of the quantum channel corresponding to the variable node connected to the unsatisfied check node, based on syndrome information and stabilizer operator information of the unsatisfied check node.

Figure 4:
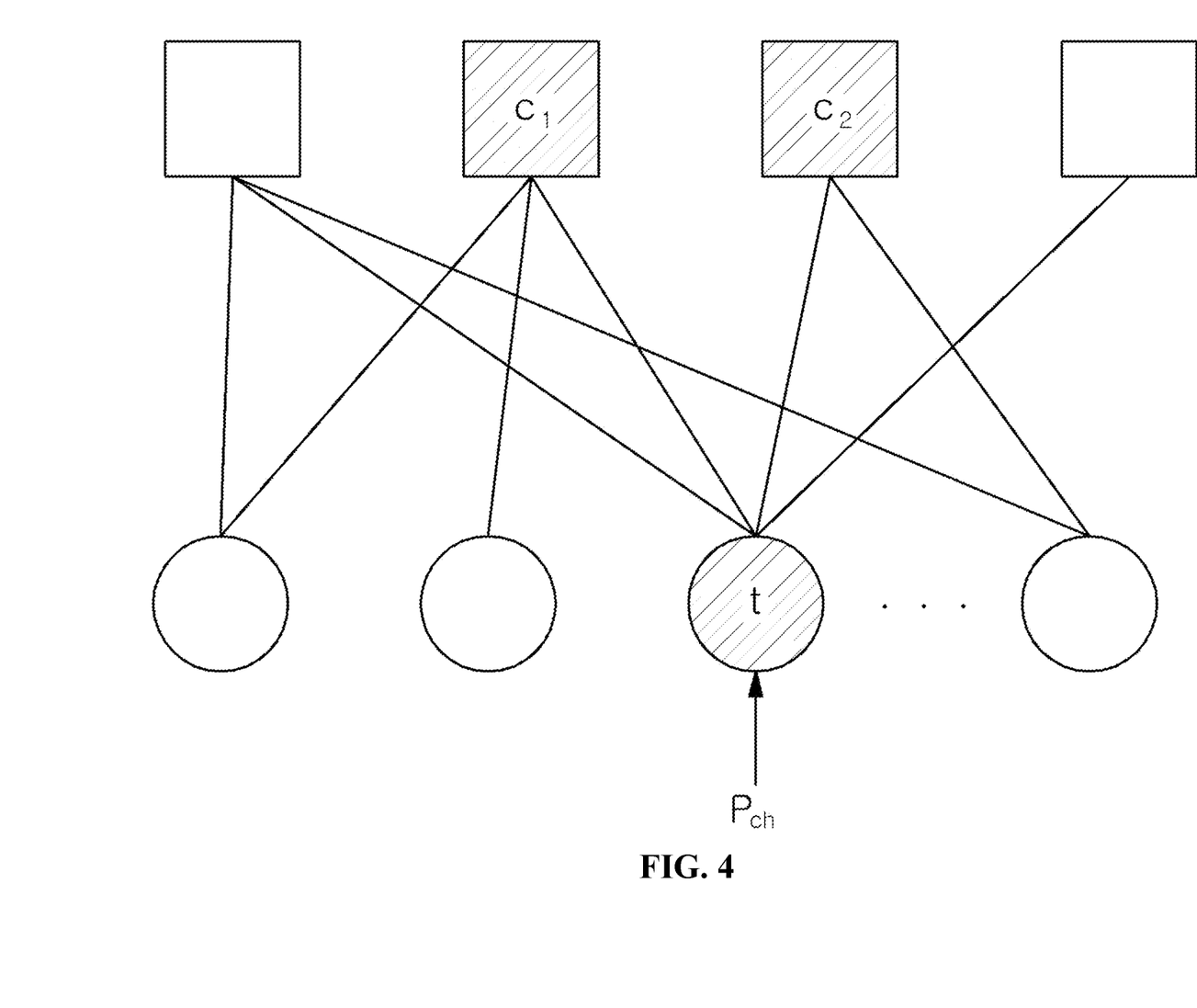
FIG. 4 is a view for explaining the quantum low-density parity-check code decoding method in FIG. 3.

In an embodiment, if a variable node is connected to a plurality of unsatisfied check nodes, the quantum low-density parity-check code decoding apparatus 2000 may ultimately determine the directivity of the quantum channel by taking into account the directivity determined by each of the plurality of unsatisfied check nodes. For example, referring to FIG. 4, a variable node t is illustrated which is connected to both of unsatisfied check nodes C1 and C2. Suppose that the unsatisfied check node C1 suggests the directivity of I or X for the variable node t, the quantum channel information to be applied to the variable node t may be expressed by the following Equation 5:

$$P_{ch}(E_t = a) = \begin{cases} \dfrac{1-p}{2}, & \text{if } a = I \text{ or } X \\ \dfrac{p}{2}, & \text{if } a = Z \text{ or } Y \end{cases} \quad \text{[Equation 5]}$$

Moreover, suppose that the unsatisfied check node C2 suggests the directivity of X or Y for the variable node t, the quantum channel information to be applied to the variable node t may be expressed by the following Equation 6:

$$P_{ch}(E_t = a) = \begin{cases} \dfrac{1-p}{2}, & \text{if } a = I \text{ or } X \\ \dfrac{p}{2}, & \text{if } a = Z \text{ or } Y \end{cases} \quad \text{[Equation 6]}$$

In addition, the ultimate directivity of the quantum channel for the variable node t may be expressed by the following Equation 7, since it has to reflect the directivity of both of the unsatisfied check nodes C1 and C2. In this case, normalization may be performed using K ($\Sigma_{E \in \{I,X,Z,Y\}} P_E$) which is the sum of the probabilities of all operators such that the sum of the probabilities of all operators becomes zero.

$$P_{ch}(E_t = a) = \begin{cases} \dfrac{(1-p)p}{4}, & \text{if } a = I \\ \dfrac{(1-p)^2}{4}, & \text{if } a = X \\ \dfrac{p^2}{4}, & \text{if } a = Z \\ \dfrac{(1-p)p}{4}, & \text{if } a = Y \end{cases} \quad \text{[Equation 7]}$$

In this case, once normalization is performed using K ($\Sigma_{E \in \{I,X,Z,Y\}} P_E$) which is the sum of the probabilities of all operators such that the sum of the probabilities of all operators becomes zero, the directivity of the quantum channel corresponding to the variable node t may be expressed by the following Equation 8:

$$P_{ch}(E_t = a) = \begin{cases} \dfrac{(1-p)p}{4K}, & \text{if } a = I \\ \dfrac{(1-p)^2}{4K}, & \text{if } a = X \\ \dfrac{p^2}{4K}, & \text{if } a = Z \\ \dfrac{(1-p)p}{4K}, & \text{if } a = Y \end{cases} \quad \text{[Equation 8]}$$

Referring back to FIG. 3, in the step S3500, the quantum low-density parity-check code decoding apparatus 2000 may reconfigure the initialized quantum channel information based on the determined directivity of the quantum channel. That is, the quantum low-density parity-check code decoding apparatus 2000 may reconfigure the error rate of the quantum channel corresponding to the variable node connected to the unsatisfied check node, the probabilities of error operators, and so on.

In the step S3600, the quantum low-density parity-check code decoding apparatus 2000 may perform a second error correction based on the reconfigured quantum channel information. The second error correction is performed in a similar manner to the first error correction, so a detailed description thereof will be omitted.

Figure 5:
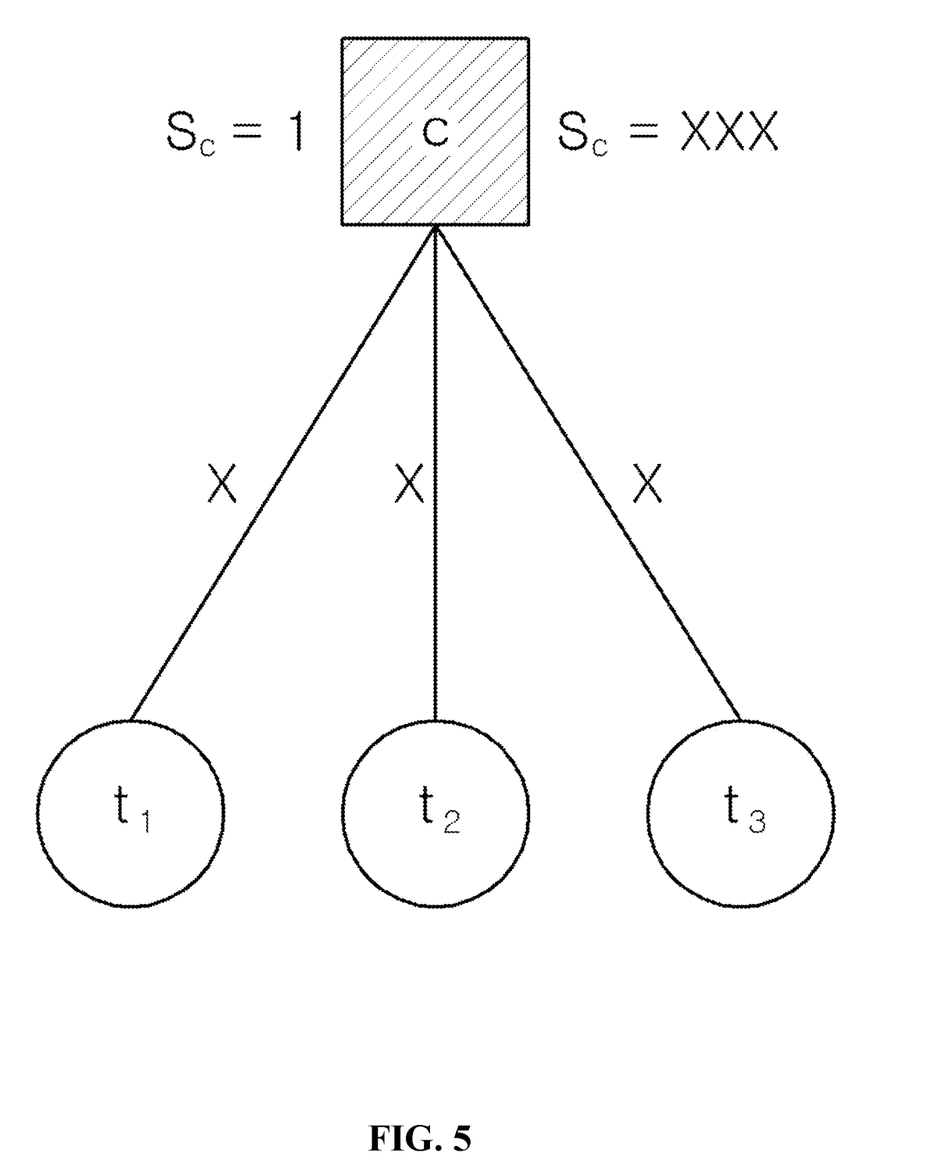
FIG. 5 is a view for explaining the iterative decoding of a quantum low-density parity-check code according to the conventional art.

FIG. 5 is a view for explaining the iterative decoding of a quantum low-density parity-check code according to the conventional art.

In an existing quantum low-density parity-check code decoding process, when reconfiguring existing quantum channel information, the post-processing algorithm determines the directivity of the quantum channel based on syndrome information of an arbitrarily selected unsatisfied check node and stabilizer operator information corresponding to the unsatisfied check node.

However, the reconfiguring of quantum channel information by determining the directivity of the quantum channel in this manner may cause unnecessary iterative decoding. This is because the directivity of error operators indicated to at least one variable node to which an unsatisfied check node is connected may be identical to the directivity of error operators estimated for each variable node after a decoding failure. That is, if the first error correction fails, error operators estimated for each variable node become involved in order to find an unsatisfied check node from a plurality of check nodes.

Accordingly, to effectively perform an iterative decoding (second error correction) process, the directivity of the quantum channel needs to be determined for each error operator estimated for the variable node whose quantum channel information will be reconfigured.

For example, referring to FIG. 5, suppose that the check node C is an unsatisfied check node, the syndrome information $s_c$ of the unsatisfied check node C is 1, the stabilizer operator $s_c$ is XXX, and the estimated error operator is ZZI. Since $s_C$ is 1 and $\hat{s}_c$ is 0, the enhanced feedback algorithm suggests the directivity of Z or Y for all variable nodes t1, t2, and t3 connected to the unsatisfied node C. However, if the variable nodes t1 and t2 are actually estimated to be Z, it is pointless to perform decoding by reconfiguring the quantum channel information for the properly estimated variable nodes t1 and t2. Moreover, the stabilizer operator of the variable node t1 is X and its estimated error operator is Z, and the two operators are not replaceable with each other. Thus, the directivity of the quantum channel is determined to be I or X which is not replaceable with Z. Likewise, the directivity of the quantum channel for the variable node t2 is determined to be I or X, and the directivity of the quantum channel for the variable node t3 is determined to be Z or Y.

Therefore, the quantum low-density parity-check code decoding method according to an embodiment of the present disclosure provides a technique of implementing efficient iterative decoding by determining the priority of variable nodes whose quantum channel information will be reconfigured and accordingly performing iterative decoding. This will be described later in details with reference to FIG. 6.

Figure 6:
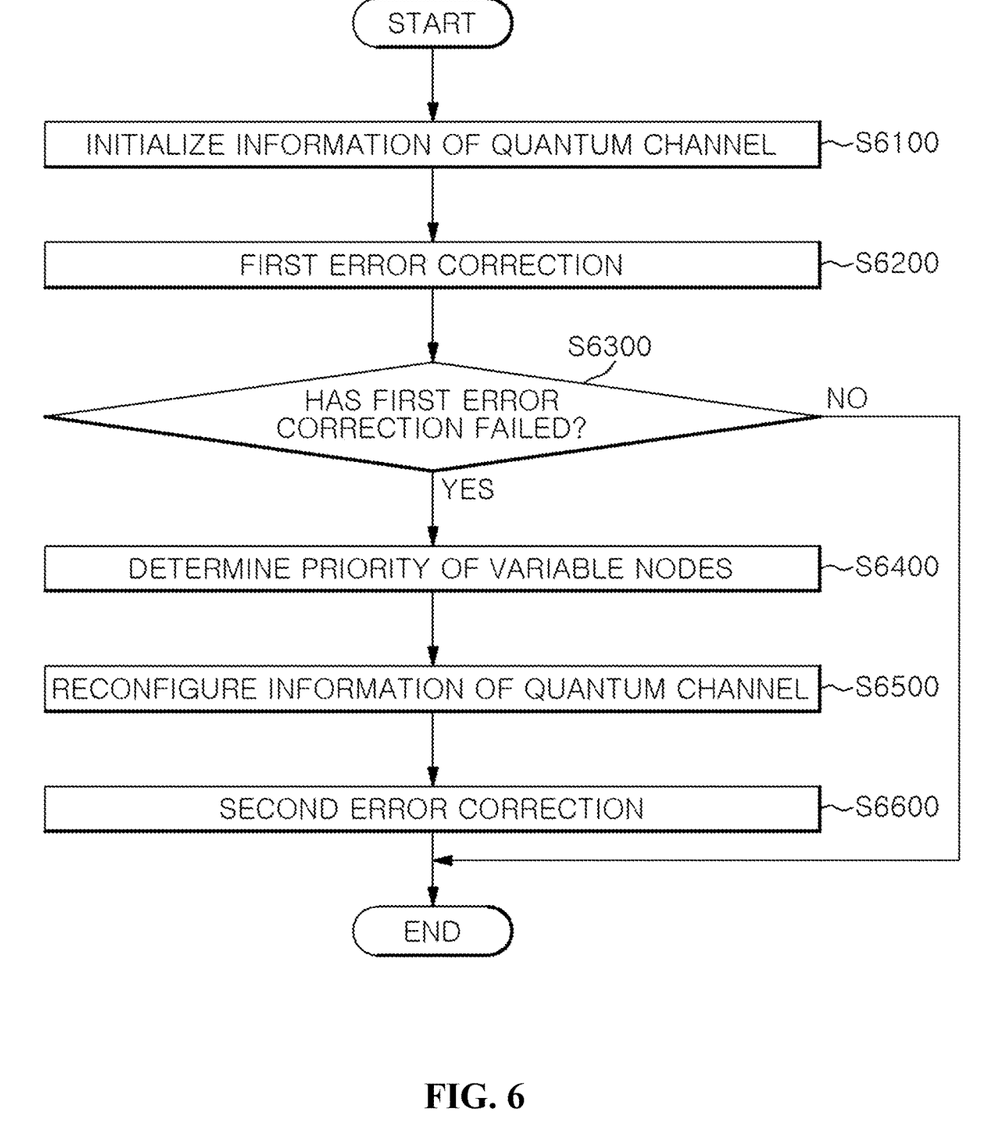
FIG. 6 is a flowchart of a method for decoding a quantum low-density parity-check code according to another embodiment of the present disclosure.

FIG. 6 is a flowchart of a method for decoding a quantum low-density parity-check code according to another embodiment of the present disclosure.

The following description will be given with an example in which this method is performed by the quantum low-density parity check code decoding apparatus 2000 illustrated in FIG. 2.

Referring to FIG. 6, the steps S6100 through S6300 are substantially identical to the steps S3100 through S3300, so a detailed description thereof will be omitted.

In the step S6400, the quantum low-density parity-check code decoding apparatus 2000 may determine the priority of variable nodes whose quantum channel information will be reconfigured, based on the number of unsatisfied check nodes connected to each variable node and the number of satisfied check nodes connected thereto.

In an embodiment, the quantum low-density parity-check code decoding apparatus 2000 may calculate the score for each variable node based on the number of unsatisfied check nodes and the number of satisfied check nodes, as in the following Equation 9:

$$\rho_j = 2\delta_{v_j} - d_{v_j} \qquad \text{[Equation 9]}$$

wherein $\delta_{v_j}$ represents the number of unsatisfied check nodes connected to a 801 variable node j, $d_{v_j}$ and represents the number of all check nodes connected to the variable node j. The score for each variable node may be used even in an irregular parity-check matrix of a quantum low-density parity-check code. The quantum low-density parity-check code 2000 may assign a score of +1 to an unsatisfied check node and a score of −1 to a satisfied check node. Thus, the quantum low-density parity-check code 2000 may obtain a score for each variable node and give higher priority for a variable node with a higher score.

Figure 7:
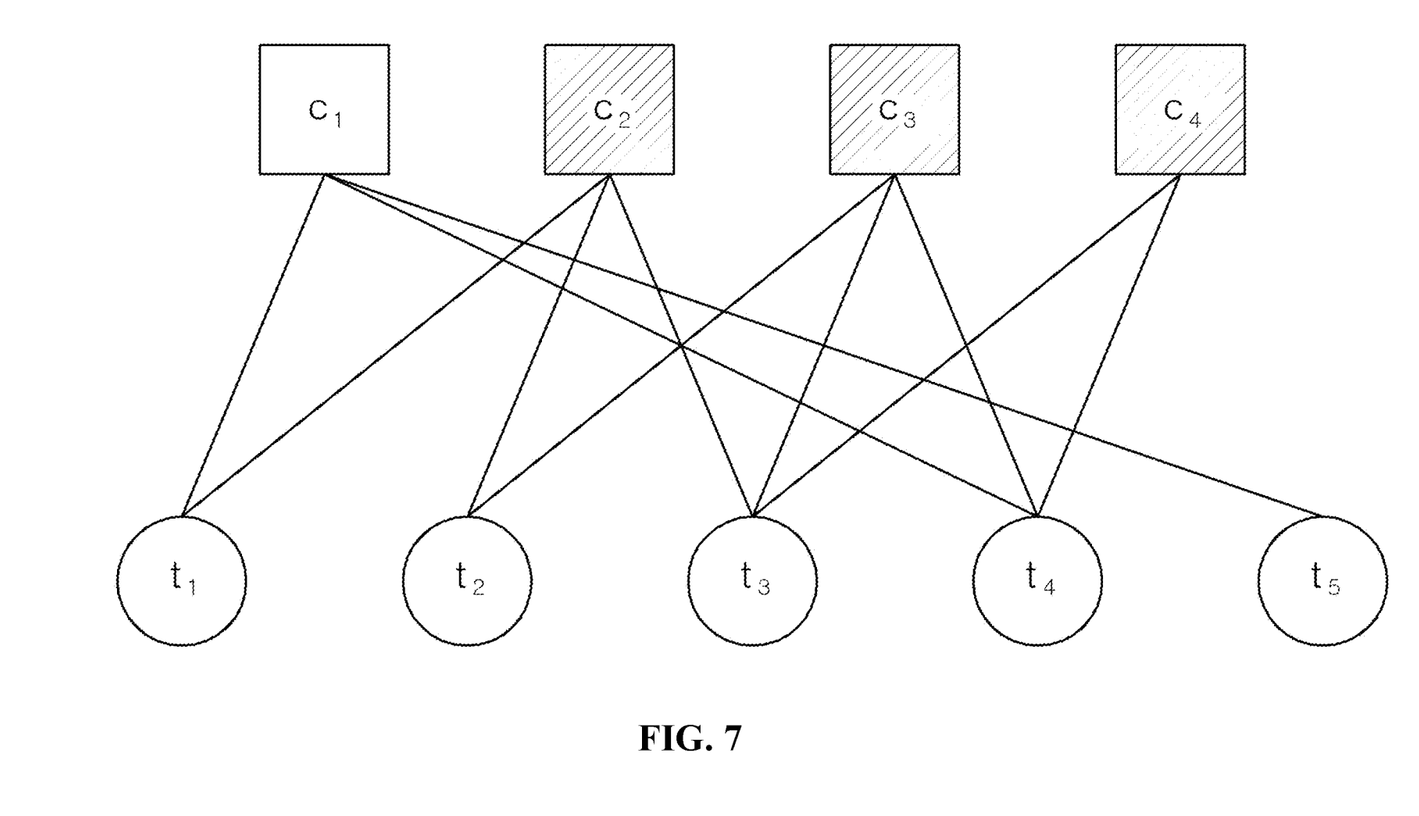
FIG. 7 is a view for explaining the quantum low-density parity-check code decoding method in FIG. 6.

For example, referring to FIG. 7, the check node C1 out of four check nodes is a satisfied check node, and the check nodes C2, C3, and C4 are unsatisfied check nodes. In this case, the quantum low-density parity-check code 2000 may exclude the variable node t5 from target variable nodes whose quantum channel information will be reconfigured, because the variable node t5 is not connected to any of the unsatisfied check nodes C2, C3, and C4. Moreover, the quantum low-density parity-check code 2000 may determine that the variable node t1 has a score of 0, the variable node t2 has a score of +2, the variable node t3 has a score of +3, and the variable node t4 has a score of +1, according to Equation 9. Thus, the quantum low-density parity-check code 2000 may determine that variable nodes whose quantum channel information will be reconfigured have priority in the order: t3, t2, t4, and t1.

In the step S6500, the quantum low-density parity-check code 2000 may determine a variable node whose quantum channel information will be reconfigured according to priority and then reconfigure the quantum channel information for the determined variable node.

In an embodiment, the quantum low-density parity-check code 2000 may reconfigure the quantum channel information according to a conventional post-processing algorithm.

In an embodiment, the quantum low-density parity-check code 2000 may reconfigure the quantum channel information according to the steps S3400 and S3500 in FIG. 3.

In the step S6600, the quantum low-density parity-check code 2000 may perform a second error correction on a qubit based on a belief propagation algorithm, in accordance with the reconfigured quantum channel information.

Figure 8:
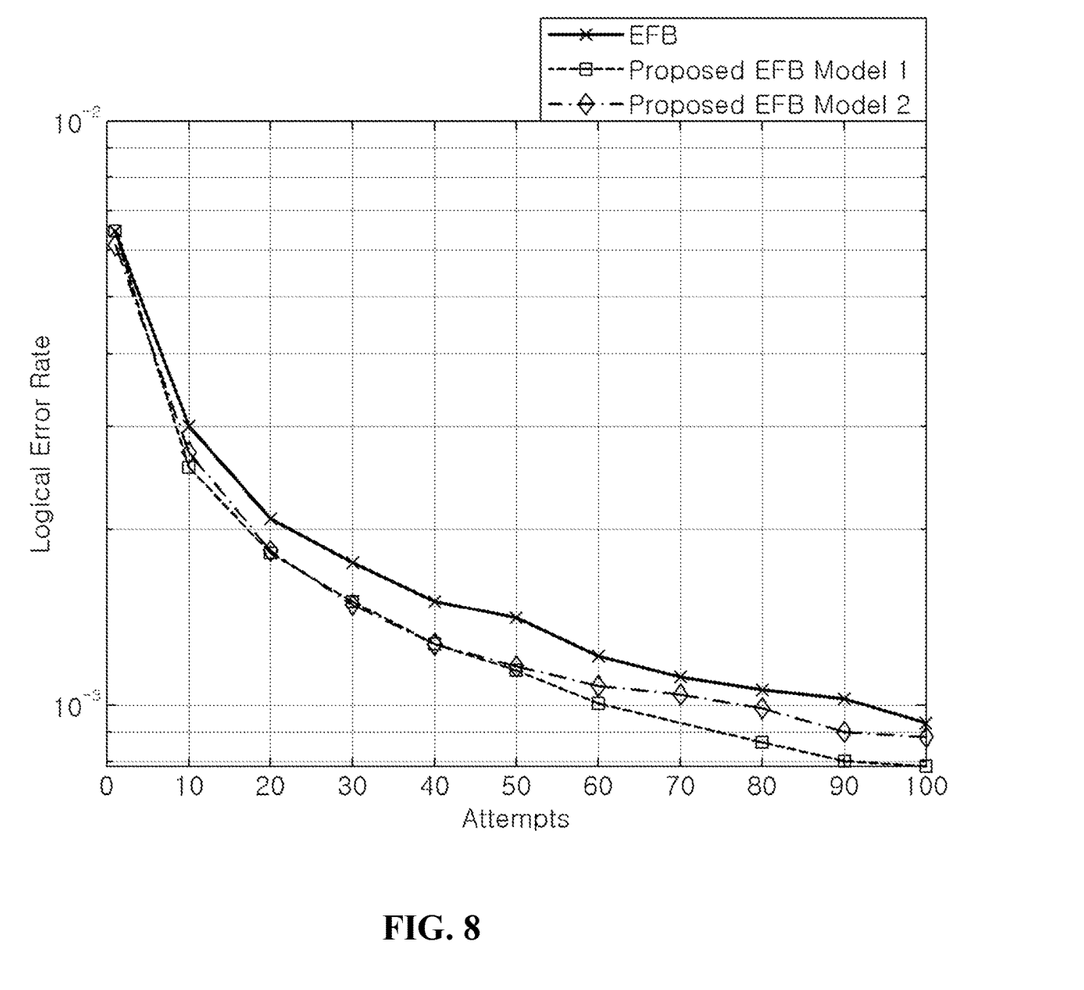
FIGS. 8 and 9 are views for explaining the performance of an apparatus for decoding a quantum low-density parity-check code according to an embodiment of the present disclosure
Figure 9:
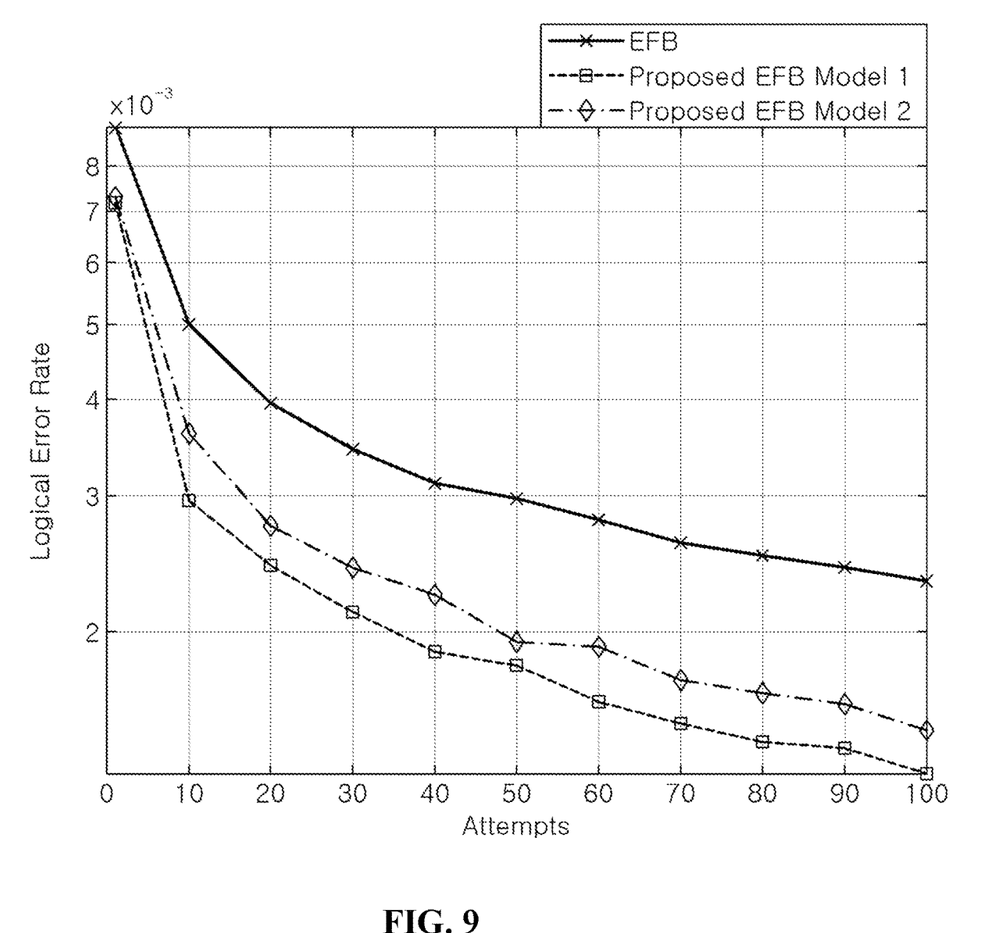

FIGS. 8 and 9 are views comparing the performance of an apparatus for decoding a quantum low-density parity-check code according to an embodiment of the present disclosure In FIGS. 8 and 9, EFB represents iterative decoding of a quantum low-density parity-check code using a conventional belief propagation algorithm, Model 1 represents iterative decoding according to the quantum low-density parity-check code decoding method illustrated in FIG. 3, and Model 2 represents iterative decoding according to the quantum low-density parity-check code decoding method illustrated in FIG. 6.

FIGS. 8 and 9 are graphs comparing the performance versus the number of decoding iterations used in a process in which code [400, 200] and code [800, 400] are iteratively decoded over a depolarizing channel (P=0.02). In this test, the maximum number of iterations was set to 100.

FIG. 8 shows that the same results as achieved by performing 100 decoding iterations of a quantum low-density parity-check code according to the conventional art were achieved by performing 70 iterations in the method of FIG. 3 or by performing 85 iterations in the method of FIG. 6.

FIG. 9 shows that the same results as achieved by 100 decoding iterations of a quantum low-density parity-check code according to the conventional art were achieved by 24 iterations in the method of FIG. 3 and by 35 iterations in the method of FIG. 6.

Figure 10:
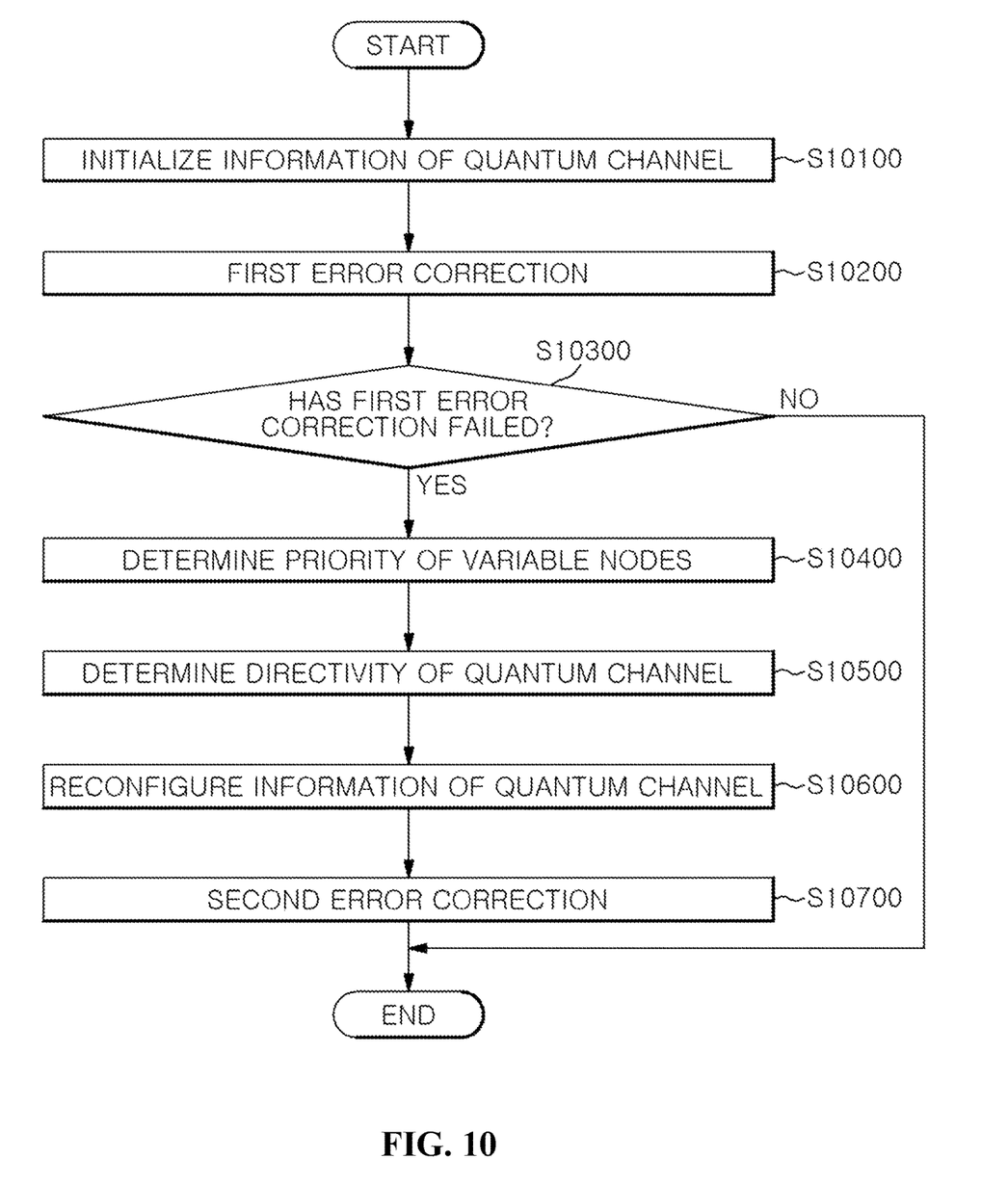
FIG. 10 is a flowchart of a method for decoding a quantum low-density parity-check code according to another embodiment of the present disclosure.

FIG. 10 is a flowchart of a method for decoding a quantum low-density parity-check code according to another embodiment of the present disclosure.

The following description will be given with an example in which this method is performed by the quantum low-density parity check code decoding apparatus 2000 illustrated in FIG. 2.

Referring to FIG. 10, the steps S10100 through S10400 are substantially identical to the steps S6100 through S6400, so a detailed description thereof will be omitted.

In the step S10500, the quantum low-density parity-check code decoding apparatus 2000 may determine the directivity of a quantum channel for a variable node with the highest priority, according to the priority of a plurality of variable nodes connected to an unsatisfied check node, whose quantum channel information will be reconfigured. A process of determining the directivity of the quantum channel is substantially identical to the step S3400 in FIG. 3, so a detailed description thereof will be omitted.

In the step S10600, the quantum low-density parity-check code decoding apparatus 2000 may reconfigure the quantum channel information for the variable node according to the determined directivity of the quantum channel.

In the step S10700, the quantum low-density parity-check code decoding apparatus 2000 may perform a second error correction on a qubit according to the reconfigured quantum channel information.

Figure 11:
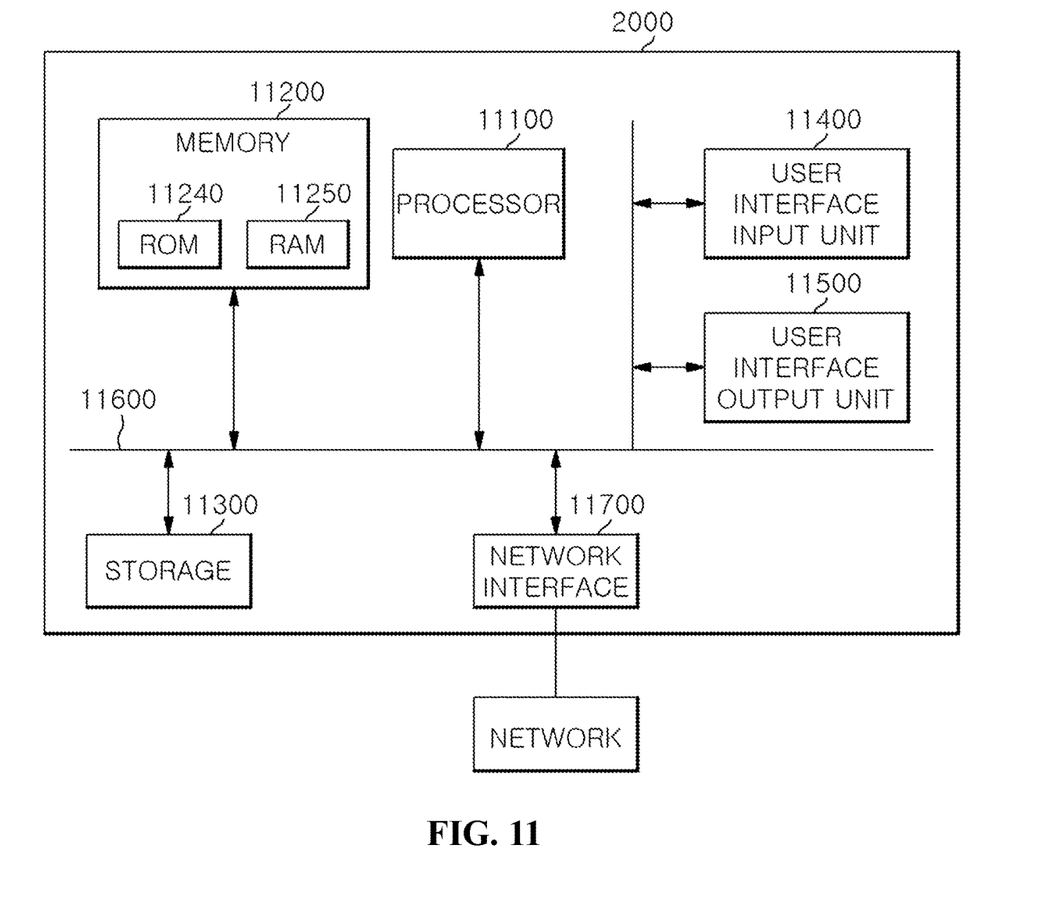
FIG. 11 is a block diagram of an apparatus for decoding a quantum low-density parity-check code according to another embodiment of the present disclosure.

FIG. 11 is a block diagram of a quantum low-density parity-check code decoding apparatus according to another embodiment of the present disclosure.

As illustrated in FIG. 11, the quantum low-density parity-check code decoding apparatus 200 may include at least one element among a processor 11100, a memory 11200, a storage 11300, a user interface input unit 11400, and a user interface output unit 11500, and they may communicate with one another via a bus 11600. Furthermore, the quantum low-density parity-check code decoding apparatus 2000 may include a network interface 11700 for connecting to a network. The processor 11100 may be a CPU or a semiconductor device for executing processing instructions stored in the memory 11200 and/or the storage 11300. The memory 11200 and the storage 11300 may include various types of volatile/non-volatile storage media. For example, the memory may include ROM 11240 and RAM 11250.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system.

In addition, the processing device may access, store, manipulate, process, and generate data in response to execution of the software. For ease of understanding, the processing device may be described as being used singly, but those skilled in the art will recognize that the processing device may include a plurality of processing elements and/or a plurality of types of processing elements. For example, the processing device may include a plurality of processors or one processor and one controller. Other processing configurations, such as a parallel processor, are also possible.

The software may include a computer program, a code, an instruction, or a combination of one or more thereof, and the processing device may be configured to be operated as desired or commands may be made to the processing device independently or collectively. The software and/or data may be permanently or temporarily embodied in any type of machine, a component, a physical device, virtual equipment, a computer storage medium or device, or a signal wave transmitted in order to be interpreted by the processing device or to provide an instruction or data to the processing device. The software may be dispersed on a computer system connected to a network, to be stored or executed in a dispersive method. The software and data may be stored in one or more computer readable recording media.

The above description is merely illustrative of the technical idea of the present disclosure, and various modifications and variations can be made by those skilled in the art to which the present disclosure pertains without departing from the essential quality of the present disclosure. Therefore, the embodiments disclosed herein are not intended to limit the technical spirit of the present disclosure, but to illustrate it, and the scope of the technical spirit of the present disclosure is not limited by these embodiments. The protection scope of the present disclosure should be interpreted by the following claims, and all technical ideas within the scope equivalent thereto should be interpreted as being included in the scope of the present disclosure.

What is claimed is:

1. A method for decoding a quantum low-density parity-check code, the method comprising:
   initializing quantum channel information;
   performing a first error correction based on a belief propagation algorithm, by using the initialized quantum channel information;
   if the first error correction fails, determining the directivity of the quantum channel for a variable node connected to an unsatisfied check node, based on the connection relationship between the unsatisfied check node and the variable node;
   reconfiguring the quantum channel information for the variable node based on the determined directivity of the quantum channel; and
   performing a second error correction based on the belief propagation algorithm, by using the reconfigured quantum channel information.

2. The method of claim 1, wherein, in the determining of the directivity of the quantum channel for the variable node, the directivity of the quantum channel for the variable node is determined, based on syndrome information and stabilizer operator information of the unsatisfied check node with respect to the variable node.

3. The method of claim 1, wherein the quantum channel information includes the error rate of the quantum channel and the probabilities of quantum error operators, and
   the directivity of the quantum channel includes the error rate and the probabilities of error operators, which are required for correcting the quantum channel information corresponding to the variable node.

4. The method of claim 3, wherein, in the determining of the directivity of the quantum channel for the variable node, if the variable node is connected to a plurality of unsatisfied check nodes, the directivity of the quantum channel is determined by normalizing the products of the error rate of each of the unsatisfied check nodes multiplied by the probabilities of error operators.

5. The method of claim 1, wherein, in the initializing of quantum channel information, the quantum channel information is initialized by using a depolarizing channel.

6. The method of claim 1, wherein, in the determining of the directivity of the quantum channel for the variable node, syndrome information of each of a plurality of check nodes is calculated based on an estimated error and a stabilizer operator, the calculated syndrome information and actual syndrome information are compared, and the first error correction is deemed a failure if the unsatisfied check code occurs in which the calculated syndrome information does not match the actual syndrome information.

7. The method of claim 1, further comprising, if a plurality of variable nodes are connected to the unsatisfied check node, determining at least one variable node whose quantum channel information will be reconfigured, based on the number of unsatisfied check nodes connected to each of the variable nodes and the number of satisfied check nodes connected thereto.

8. A method for decoding a quantum low-density parity-check code, the method comprising:
   initializing quantum channel information;
   performing a first error correction based on a belief propagation algorithm, by using the initialized quantum channel information;
   if the first error correction fails, determining the priority of variable nodes whose quantum channel information will be reconfigured, based on the number of unsatisfied check nodes connected to each of the variable nodes and the number of satisfied check nodes connected thereto;
   reconfiguring the quantum channel information for the variable nodes based on the determined priority; and
   performing a second error correction based on the belief propagation algorithm, by using the reconfigured quantum channel information.

9. An apparatus for decoding a quantum low-density parity-check code, the apparatus comprising:
   a memory including an instruction; and
   a processor that initializes quantum channel information by executing the instruction, that performs a first error correction based on a belief propagation algorithm, by using the initialized quantum channel information, that, if the first error correction fails, determines the directivity of the quantum channel for a variable node connected to an unsatisfied check node, based on the connection relationship between the unsatisfied check node and the variable node, that reconfigures the quantum channel information for the variable node based on the determined directivity of the quantum channel, and that performs a second error correction based on the belief propagation algorithm, by using the reconfigured quantum channel information.

10. The apparatus of claim 9, wherein the processor determines the directivity of the quantum channel for the variable node, based on syndrome information and stabilizer operator information of the unsatisfied check node with respect to the variable node.

11. The apparatus of claim 9, wherein the quantum channel information includes the error rate of the quantum channel and the probabilities of quantum error operators, and the directivity of the quantum channel includes the error rate and the probabilities of error operators, which are required for correcting the quantum channel information corresponding to the variable node.

12. The apparatus of claim 11, wherein, if the variable node is connected to a plurality of unsatisfied check nodes, the processor determines the directivity of the quantum channel by normalizing the products of the error rate of each of the unsatisfied check nodes multiplied by the probabilities of error operators.

13. The apparatus of claim 9, wherein the processor initializes the quantum channel information is configured by using a depolarizing channel.

14. The apparatus of claim 9, wherein the processor calculates syndrome information of each of a plurality of check nodes based on an estimated error and a stabilizer operator, compares the calculated syndrome information and actual syndrome information, and deems the first error correction a failure if the unsatisfied check code occurs in which the calculated syndrome information does not match the actual syndrome information.

15. The apparatus of claim 9, wherein, if a plurality of variable nodes are connected to the unsatisfied check node, the processor determines at least one variable node whose quantum channel information will be reconfigured, based on the number of unsatisfied check nodes connected to each of the variable nodes and the number of satisfied check nodes connected thereto.

* * * * *